(12) United States Patent
Cr et al.

(10) Patent No.: US 11,188,511 B2
(45) Date of Patent: Nov. 30, 2021

(54) OFFLOADING FILE-INDEXING TO MEMORY CARD FIRMWARE

(71) Applicant: Western Digital Technologies, Inc., San Jose, CA (US)

(72) Inventors: Narendhiran Cr, Bangalore (IN); Muralitharan Jayaraman, Bangalore (IN); Sivaraj Velusamy, Bangalore (IN); Chandra Lakkimsetty, Bangalore (IN); Vithya Kannappan, Bangalore (IN); Balakumar Rajendran, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 177 days.

(21) Appl. No.: 16/431,667

(22) Filed: Jun. 4, 2019

(65) Prior Publication Data

US 2020/0387493 A1    Dec. 10, 2020

(51) Int. Cl.
  *G06F 16/00*   (2019.01)
  *G06F 16/22*   (2019.01)
  *G06F 16/18*   (2019.01)
  *G06F 16/23*   (2019.01)
  *G06F 16/41*   (2019.01)

(52) U.S. Cl.
  CPC ...... *G06F 16/2272* (2019.01); *G06F 16/1847* (2019.01); *G06F 16/23* (2019.01); *G06F 16/41* (2019.01)

(58) Field of Classification Search
  CPC .. G06F 16/2272; G06F 16/23; G06F 16/1847; G06F 16/41
  See application file for complete search history.

(56) References Cited

U.S. PATENT DOCUMENTS

| | | | |
|---|---|---|---|
| 2004/0242029 A1* | 12/2004 | Nakamura | G11B 20/00746 439/66 |
| 2007/0130370 A1 | 6/2007 | Akaezuwa | |
| 2009/0204957 A1* | 8/2009 | Nishibayashi | G06F 9/452 717/172 |
| 2011/0093500 A1* | 4/2011 | Meyer | G06F 16/972 707/774 |
| 2013/0013606 A1* | 1/2013 | Stanfill | G06F 16/2322 707/737 |
| 2014/0222824 A1* | 8/2014 | Joshi | G06F 16/2228 707/741 |
| 2015/0120748 A1* | 4/2015 | Kraynak | G06F 16/148 707/741 |

* cited by examiner

*Primary Examiner* — Hung Q Pham
(74) *Attorney, Agent, or Firm* — Chang & Hale LLP

(57) ABSTRACT

Systems and methods are disclosed for a self-indexing removable storage device. In certain embodiments, the removable storage device is configured to be connected to a memory reader of a host device. The removable storage device comprises storage media, a controller configured to run firmware, and a buffer. The controller is configured to, while connected to a first host device, receive a write operation from the first host device, monitor changes to the storage media caused by the write operation, and update a file index stored on the removable storage device with the monitored changes. The controller is further configured to, in response to connecting the removable storage device to a memory reader of a second host device, provide the file index to an application on the second host device, and cause the application to display files on the storage media based on the file index.

20 Claims, 4 Drawing Sheets

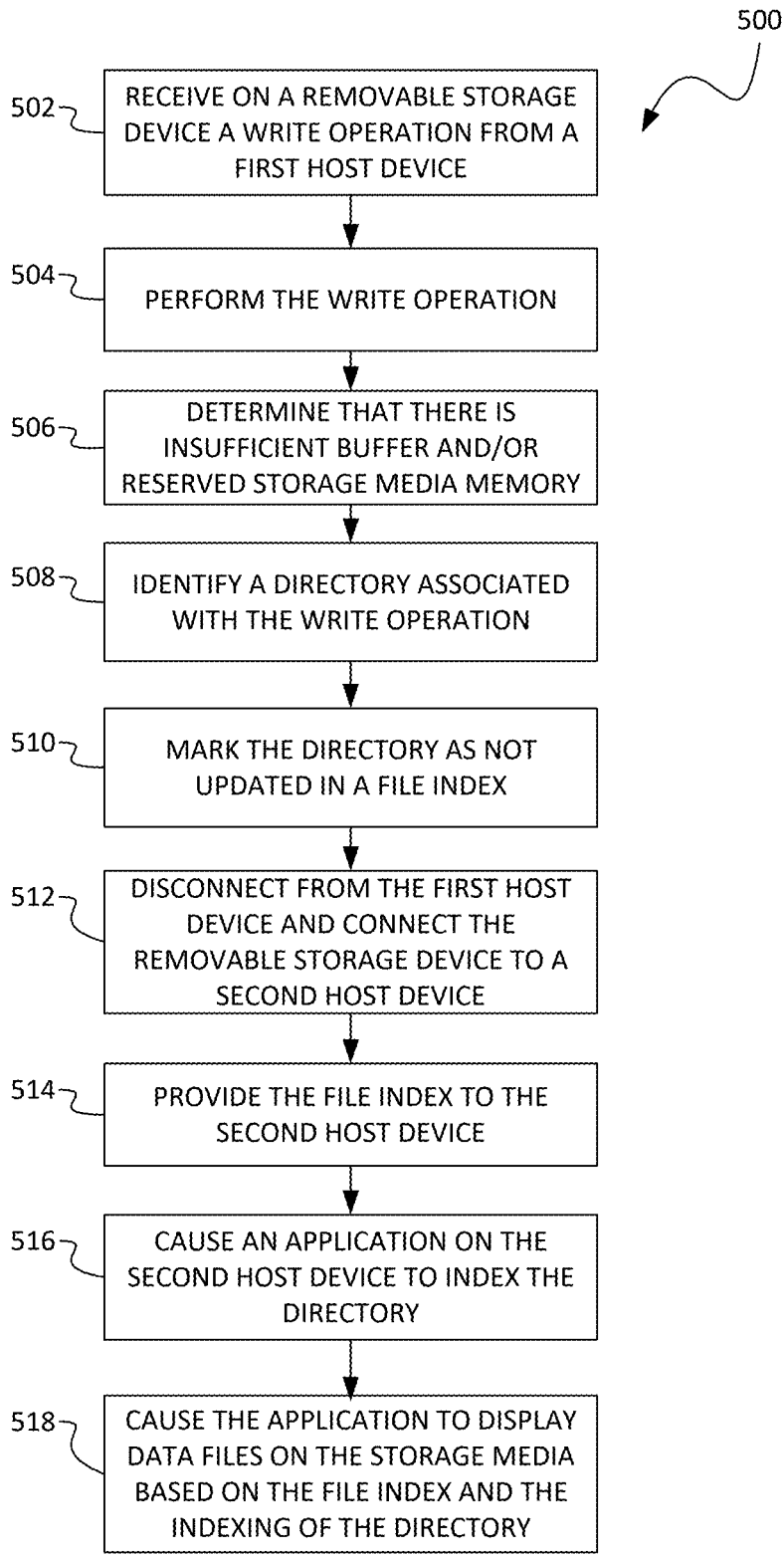

OFFLOADING FILE-INDEXING TO MEMORY CARD FIRMWARE

BACKGROUND

Field

This disclosure relates to data storage devices. More particularly, the disclosure relates to systems and methods for indexing removable storage devices.

Description of Related Art

Removable storage devices allow host computing devices, such as mobile phones and tablets, to expand available memory. Generally, the host computing devices perform indexing on newly inserted removable storage devices in order to identify files stored on the removable storage device.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 5 is a flow diagram of a process for handling a situation where there is insufficient memory for the file index in the removable storage device, according to some embodiments.

DETAILED DESCRIPTION

Figure 1:
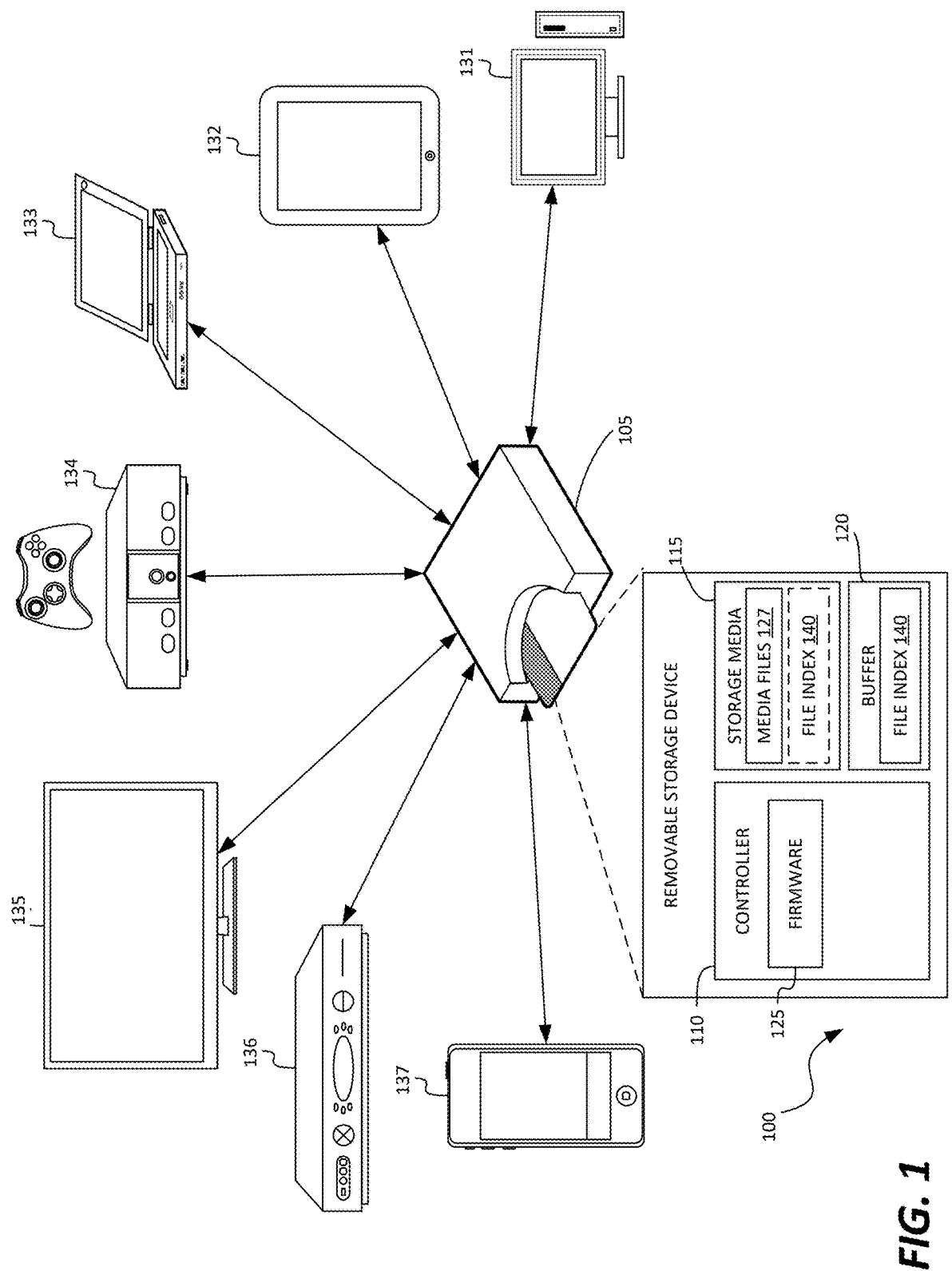
FIG. 1 is a diagram illustrating a removable storage device 100, according to some embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Disclosed herein are systems, devices, and methods for allowing removable storage devices to perform indexing by itself, without relying on an external computing device. The removable storage device can monitor changes on its storage media and can maintain an index of those changes. When inserted or otherwise connected to a host system, the removable storage device can provide the host system with its index, eliminating the need for indexing by the host system or at least reducing the amount of indexing performed by the host system.

Otherwise, if indexing has to be performed by the host system to identify the files and directories stored on the card, the user experience may suffer. Indexing can take several seconds and can cause a slowdown in the user interface. In some cases, indexing may be performed multiple times, as different directories are opened, causing small slowdowns every time a new directory is viewed by the user. By having the removable storage device perform self-indexing, the user experience can be improved by eliminating or at least reducing slowdowns when the removable storage device is first connected to the host system.

Certain methods and processes can be implemented by the removable storage device to cope with the limited computing resources available on the removable storage device. For example, available random-access memory (RAM) for maintaining the index can run out on the removable storage device. In some embodiments, the removable storage device can use a tree data structure and dirty bits to identify which files on its storage media have been index and which ones have not. When connected to a host system, the removable storage device can provide a partial index for some of the files and directories in its media and can then identify, using its tracking data, to the remaining files and directories that need to be indexed to the host system.

The systems and methods of this disclosure may be useful in hard disk drives (HDDs), solid state hybrid drives (SSHDs), and solid-state drives (SSDs). As used in this application, "non-volatile solid-state memory," "non-volatile memory," "non-volatile memory die", "NVM," "solid-state memory," "solid-state data storage," "semiconductor memory die" or variations thereof may refer to solid-state memory such as NAND flash. Solid-state memory may comprise a wide variety of technologies, such as flash integrated circuits, Phase Change Memory (PCM, PC-RAM or PRAM), Programmable Metallization Cell RAM (PMC-RAM or PMCm), Ovonic Unified Memory (OUM), Resistance RAM (RRAM), NAND memory, NOR memory, electrically erasable programmable read-only memory (EEPROM), Ferroelectric Memory (FeRAM), Magnetoresistive RAM (MRAM), or other discrete NVM (non-volatile solid-state memory) chips. Other forms of storage (e.g., battery backed-up volatile DRAM or SRAM devices, magnetic disk drives, etc.) may additionally or alternatively be used.

Removable Storage Device

FIG. 1 is a diagram illustrating a removable storage device 100, according to some embodiments. A removable storage device 100 can include a combination of hardware and software. In one embodiment, the removable storage device 100 comprises a memory card, such as a Secure Data (SD), microSD, miniSD, nanoSD or other form factor memory card. The removable storage device 100 may be connected to one or more host devices.

In one embodiment, the removable storage device 100 is inserted into a memory reader 105 in the computing device. The memory reader may be a built-in card reader or memory slot in a host device or a connection interface capable of reading data from the removable storage device. In one embodiment, the memory reader of the computing device comprises a connection interface such as Universal Serial Bus (USB) (e.g., USB 2.x, USB 3.x, USB Type-C, etc.), Lightning, external Serial Advanced Technology Attachment (eSATA), or the like.

Types of host devices can include phones 137, such as smart phones, cable set-top boxes 136, smart TV's 135, video game consoles 134, laptop computers 133, tablet computers 132, desktop computers 131, wearable computers (not shown) and/or other computing devices that allow expansion of data storage by adding removable storage devices 100. In one embodiment, the removable storage device 100 is a memory card (e.g., miniSD or microSD) that is inserted into a memory slot of a phone 137.

In some embodiments, the removable storage device 100 comprises a controller 110, a storage media 115, and buffer 120. The controller may be a SD host controller chip, integrated circuit, or the like. The controller can be configured to run firmware 125 for controlling read or write operations on the storage media 115. In one embodiment, the firmware 125 is configured to monitor changes made on the storage media 115 and maintain a file index 140 comprising the contents of the storage media. In some situations, all or a portion of the firmware is kept in the buffer 120. For example, active code of the firmware being run by the controller can be kept in the buffer 120.

The term "controller" is used herein according to its broad and ordinary meaning, and may refer to any circuitry, module, device or component of the storage device 100 configured to perform any of the functional aspects of the present disclosure. For example, one or any combination of circuitry from a storage controller, a host interface, and/or a storage medium interface can be referred to as the controller 110 or part of the controller 110.

In some embodiments, the storage media 115 comprises non-volatile memory such as NAND flash or other types of solid-state memory. The non-volatile memory can be used for persistent storage of one or more media files 127. In some embodiments, the storage media 115 comprises a magnetic disk drive, alone (e.g., HDD) or in combination with solid-state memory (e.g., SSHD).

In one embodiment, the file index 140 is stored on the buffer 120. The buffer can be RAM, cache, or other volatile memory. Generally, the buffer is a limited size, to limit costs in manufacturing the removable storage device. For example, the buffer may be 128 kilobytes (KB), 256 KB, 384 KB, 512 KB, 1 megabyte (MB), or the like. Due to the limited size, the file index 140 may become too large in some situations to fit entirely in the buffer. In one embodiment, updates to the file index are stopped once the available buffer size is exceeded. The file index can be marked to indicate which directories contain changes that are not reflected in the file index. For example, a dirty bit can be used to indicate that a particular directory is not updated and will need to be indexed by the host system to determine the current contents. While the above has discussed small buffer sizes (e.g., 1 MB or less) in other embodiments, the buffer can be larger than 1 MB. For example, more expensive removable storage devices can include larger buffers for better performance.

In some embodiments, the file index 140 can be periodically flushed from the buffer 120 to the storage media 115. In one embodiment, a reserved area is allocated in the storage media for storing the flushed file index data. For example, the file index 140 may be flushed to ensure that a persistent copy of the file index is maintained. In some embodiments, the file index 140 is partially stored in the buffer, with the rest of file index 140 stored in the storage media. The file index stored on the storage media may be the full index (e.g., immediately after a flush operation from the buffer) or may be a partial file index (e.g., recent updates may only be on the buffer). In one embodiment, garbage collection is performed on the reserved area to free up available space.

In one embodiment, the buffer 120 size is less than 1 MB while the reserved area in the storage media 115 for the file index is in the tens of MB (e.g., 10-100 MB). Other embodiments can use other sizes. However, larger buffer sizes can significantly raise manufacturing costs. Further, the reserved area available in the storage media 115 may be limited to the amount of excess memory from the advertised capacity of the removable storage device 100. For example, SD cards advertised as having a certain capacity (e.g., 32 GB, 64 GB, 128 GB, etc.) typically have extra memory cells over that stated capacity. These extra memory cells can be used as the reserved area without cutting into the stated capacity available to a user. However, these extra cells are limited, and may only be in the tens of MB. While more of the storage media could be reserved, the stated capacity would have to be lowered, potentially reducing the selling price of the removable storage device 100.

In some embodiments, the removable storage device 100 is unpowered (e.g., contains no battery, such as a memory card) and disconnecting from the host device causes data stored on the buffer 120 to be lost. In one scenario, the removable storage device 100 may receive a disconnect notification from the host device (e.g., phone 137) and flush the file index 140 to the buffer 120. In some situations, the removable storage device 100 may lose power before the file index can be flushed to persistent storage, resulting in data loss. In one embodiment, the file index is rebuilt from persistently stored data in the storage media 115. If an older version of the file index is stored on the storage media 115, the older version can be used as the basis for the re-created file index and the storage media 115 can be searched for updates to the file index. Alternatively, a new file index can be built by performing indexing operations again on the storage media 115.

In one embodiment the file index 140 comprises a delta structure that tracks changes made to the storage media 115. The controller 110 can monitor writes to the storage media 115 and track changes to the files and/or directories stored in the storage media. This monitoring can be transparent to the host device. For example, the host device can send a write command normally, have it performed, and have no indication or involvement in tracking the changes to the storage media 115. Rather, the controller 110 of the removable storage device 100 can perform the indexing transparent to the host device.

One implementation of the delta structure comprises a tree structure with parent and child nodes to track information such as the directory index, page address, a dirty bit, and/or folder/file attributes. As changes to the files on the storage media 115 are identified, those changes are reflected in the tree structure. For example, new directories created on the storage media 115 can cause new nodes to be added to the tree structure. Changes to a directory in the storage media 115 can lead to updates in the corresponding node for that directory. A file system directory of the files stored on storage media 115 can then be generated from the delta structure.

When a conventional SD card is inserted into the phone 137, the phone does not know what data is stored on the SD card. The phone must then perform indexing on the card to identify the files and directories stored on the card, so that it can display the files available on the card to a user. This indexing can take several seconds and can cause a slowdown in the user interface. In some cases, the indexing may be broken up in discrete chunks, such as when a user opens a particular directory. These discrete chunks of indexing can cause small slowdowns every time a new directory is viewed by the user.

In one scenario involving a host device, such as a phone 137, the removable storage device 100 is inserted into a memory slot of the phone 137. In contrast to the conventional SD card, the removable storage device 100 can provide the file index 140 it has maintained to the phone 137 (or other host device). This reduces the interface slowdown experienced by the user as the phone 137 does not need to index the removable storage device 100 itself. Rather, the phone 137 can rely on the existing file index 140 maintained by the storage device.

In some embodiments, the removable storage device 100 may implement an interface or protocol for transmitting the file index 140 to an application on the phone 143. Such an interface can enable the removable storage device 100 to communicate the availably of the file index 140 and to initiate the transfer of the file index 140. For example, in one implementation, connecting the removable storage device to the host device can cause the RSD to send a notification to the phone 143 that the file index 140 is available. The application on the phone 143 can receive the notification and determine that it should obtain the file index 140. It can then use the interface/protocol to send a message requesting transfer of the file index 140. The removable storage device 100 can then send the file index 140 to the requesting application.

The above has discussed one possible implementation, but others are possible. For example, the application may be configured to automatically search or query for the existence of a file index (with or without any notification from the removable storage device). In one example, special vendor or manufacturer specific commands may be implemented to allow the application to obtain the file index 140 and/or to indicate which directories need to be indexed. In another example, the file index may be kept as a file in a particular location and/or format according to a public specification (e.g., published standard) and any application can access it if desired.

Delta Structure for File Index

Figure 2:
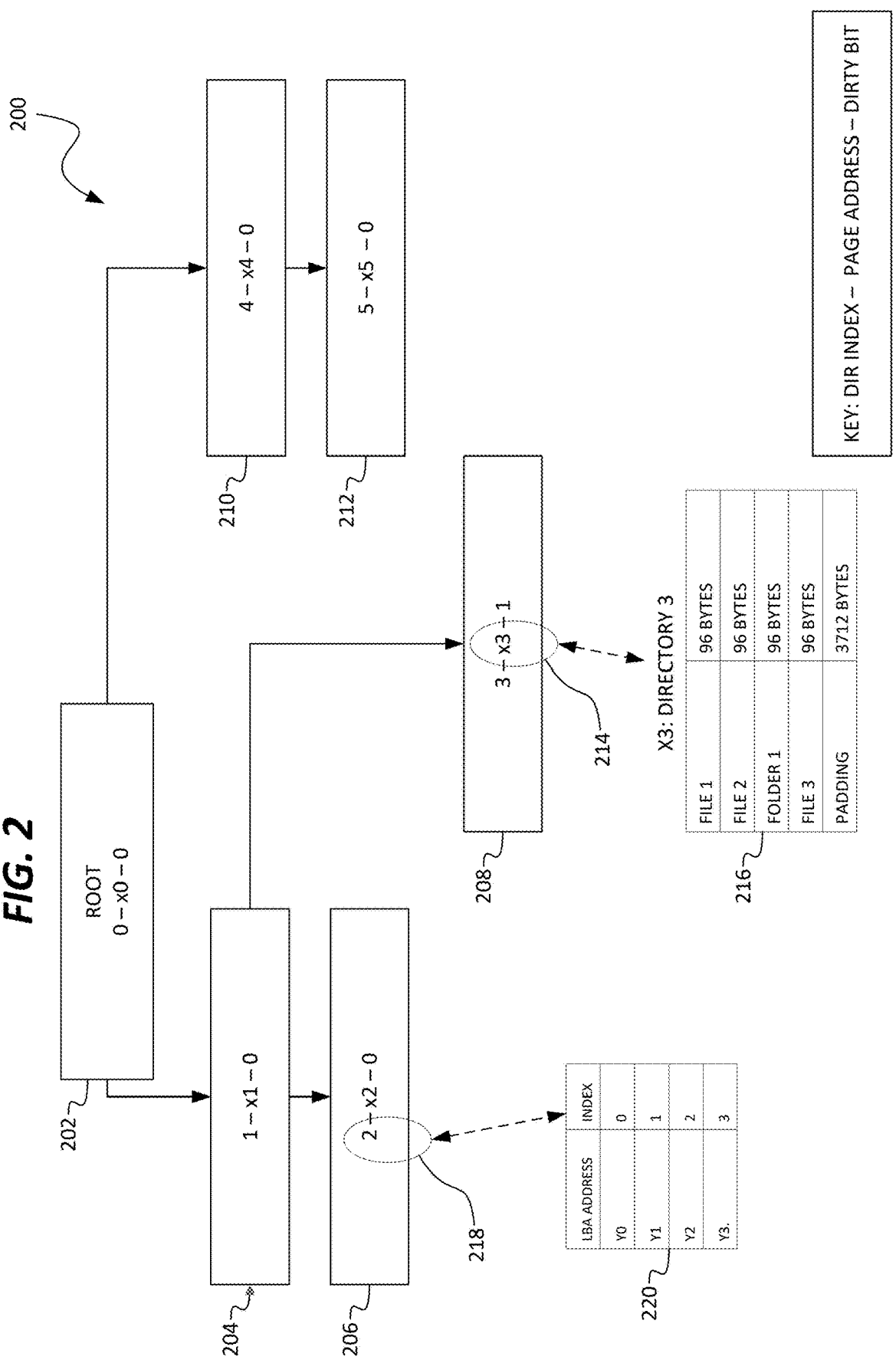
FIG. 2 is a diagram of a file index comprising a delta structure, according to some embodiments.

FIG. 2 is a diagram of a file index 140 comprising a delta structure 200, according to some embodiments. As discussed above, in one embodiment, the delta structure 200 comprises a tree structure. The tree structure comprises a root node 202 with two child nodes 204, 210. Node 204 has two child nodes 206, 208. Node 210 has a child node 212.

In one embodiment, each node comprises a directory index, a page address, and a dirty bit, represented in FIG. 2 in the format X-Y-Z, where X is the directory index, Y is the address, and Z is the dirty bit. In one embodiment, the directory index identifies the file directory represented by the node, the page address points to a location storing directory data on the directory attributes and file attributes for the directory and its files, and the dirty bit indicates whether the tree structure is up-to-date with the index information for that directory.

In some embodiments, attributes comprise of metadata associated with computer files. Such attributes can include file type, file name, file system permissions, filename extensions, file size, various dates or timestamps (e.g., creation date, last modified date, etc.), and/or file status (e.g., archive, hidden read-only, encrypted, compressed, etc.).

In one example, a page address 214 points to a page 216 containing the attribute information for directory 3, which is associated with node 208. In one embodiment, each file or folder attribute is 96 bytes in 4 KB page. The illustrated page 216 contains attribute information for file 1, file 2, folder 1, and file 3. The remaining bytes (3712 KB) of the 4 KB page are unused bytes, referred to as padding. As will be apparent, other embodiments can use different page sizes and/or different sizes for storing the file/folder attributes.

Optionally, a lookup table 220 can be used to maintain a list of staring Logical Block Addresses (LBAs) of all the stored directory addresses along with the index of the directory tree. For example, node 206 comprises directory index 218 (i.e. "2"). Using the lookup table, the LBA address of node 206 can be found (i.e., "Y2") using the directory index 218. The LBA address can be used to monitor incoming writes for directory writes. The index can be used to update the directory tree with the new directory.

Indexing Processes

Figure 3:
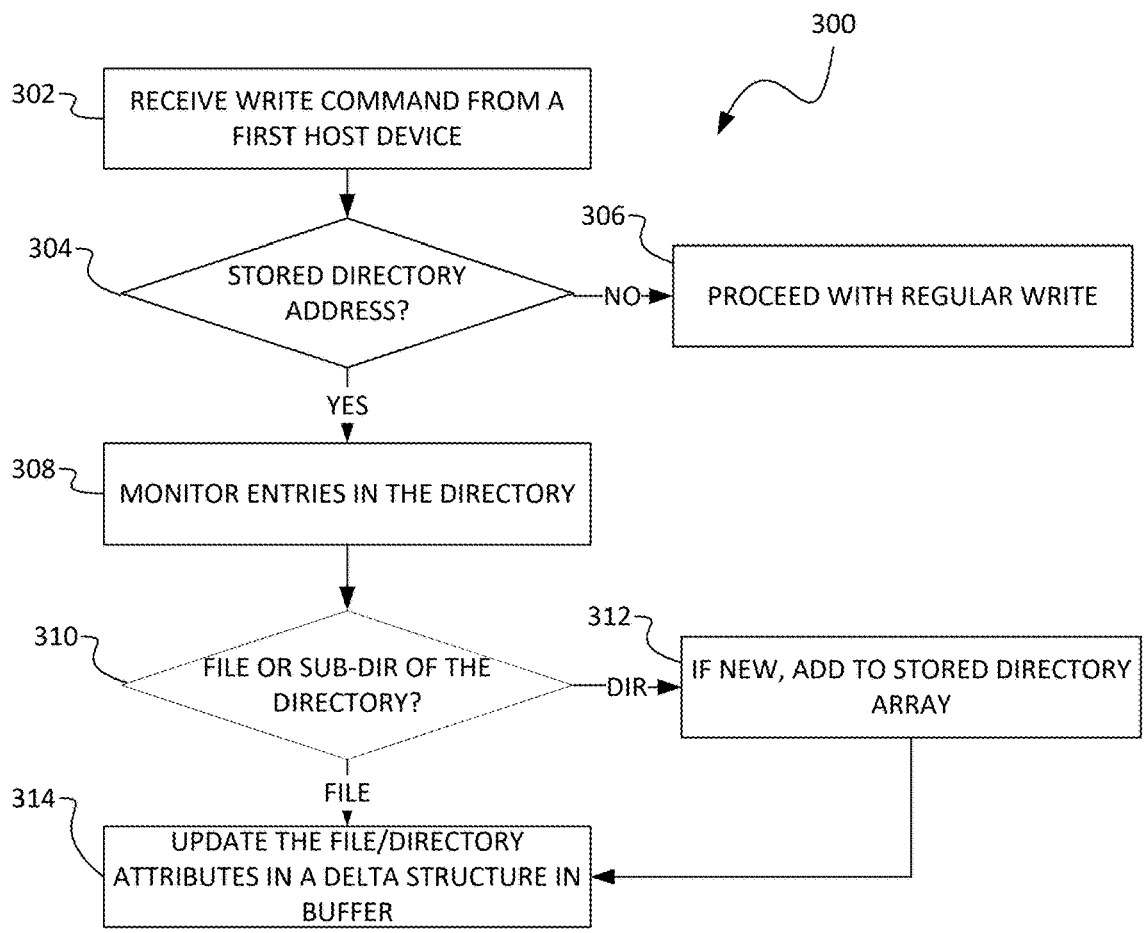
FIG. 3 is a flow diagram of a process for monitoring changes to the removable storage device, according to some embodiments.

FIG. 3 illustrates a process 300 for monitoring changes to the removable storage device 100, according to some embodiments. At least some of the steps of the process 300 may be implemented by one or more components of the removable storage device 100, such as the controller 110 and/or firmware 125. For ease of explanation, the following describes the controller 110 as performing the process, though other components of the removable storage device 100 could perform one or more of the steps.

At block 302, the controller 110 receives a write command from a first host device. The write command includes data to be written to the storage media. Prior to receiving the write command, the removable storage device 100 is connected to the first host device. The write command is then initiated by the first host device. For example, a user may be copying files form the first host device to the removable storage device 100.

At block 304, the controller 110 determines whether an address associated with the write operation is a directory address. In some embodiments, a directory data structure is referenced by a directory address. Certain write operations, such as creating a new sub-directory or a new file in the directory, can affect the directory. Other operations, such as changing the contents of existing files in the directory, may not change the directory as the existing files are already listed in the directory data structure. In one embodiment, the removable storage device 100 can maintain a list or other data structure of directory addresses. The controller 110 can then search the data structure to determine if the address is already in the data structure containing the directory addresses. Based on the determination, the process proceeds to block 306 or block 308.

If the address does not involve a directory address, the process proceeds to block 306. Changes that do not affect the directory (e.g., changes to file contents only) may not need to be tracked. In those cases, the controller 110 can perform a regular write operation, with no changes to the file index 140.

If the address does involve a directory address, the process proceeds to block 308. At block 308, the controller 110 monitors entries being made in the affected directory associated with the write command. For example, adding a sub-directory or a new file can cause new entries to be the directory's data structure.

In some embodiments, indexing work can be done during idle times in order to not affect the write performance of the removable storage device 100. For example, updates caused by the write can be tracked using the dirty bit in the file index. The actual indexing and updates to the file index can occur after the write operation is complete. The dirty bit can then be reset once the indexing is complete. For example, the dirty bit can be set to "1" if the node associated with the directory in the file index is not updated and the dirty bit can be reset to "0" once the node has been updated.

At block 310, the controller 110 determines whether the write command affects a file or sub-directory of the directory. If the write command affects a file, the process 300 proceeds to block 312. If the write command affects a directory (e.g., sub-directory of current directory), then the process proceeds to block 314.

At block 312, the controller 110 determines if the sub-directory affected by the write operation is new. If new, the sub-directory can be added to a directory array storing the directories in the storage media 115. By keeping the directory array up-to-date, the removable storage device 100 can quickly find a directory in the storage media 115. In one embodiment, the directory array can store one or more links (e.g., addresses) to enable quick access to data. For example, the directory array can store links to the directory data pages and/or to directory attribute pages. The process can then proceed to block 314.

At block 314, the controller 110 updates or adds the attributes of the file or sub-directory in an attribute data structure (e.g., an attribute page associated with the directory). The controller 110 can also update the attributes of the directory itself (e.g., to reflect a newly added file or sub-directory). For example, if the file is new, then the attributes of the file can be added to the attribute data structure associated with the directory. The attributes of the directory can also be updated to reflect the new file being added. If the file is an existing file, then the existing attributes for the file can be updated with changes, such as a new file size or timestamp. The process may then end.

In some embodiments, the updates to the attributes are maintained in a delta structure, embodiments of which are discussed in FIG. 2. The delta structure can be maintained in a buffer 120 of the removable storage device 100. In some embodiments, the volatile memory used for maintaining the delta structure is small, such as less than 1 MB or even a few hundred KB. Due to the small size, the delta structure may be flushed to the storage media 115 periodically and/or when a particular threshold is reached (e.g., free volatile memory being less than a specified amount).

Figure 4:
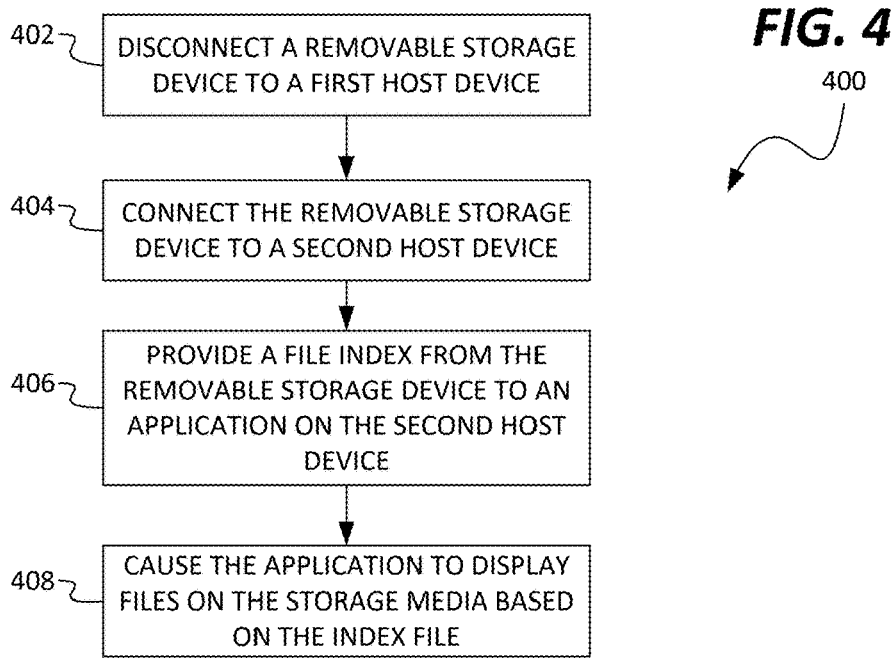
FIG. 4 is a flow diagram of a process for connecting a removable storage device to a host device, according to some embodiments.

FIG. 4 illustrates a process 400 for connecting a removable storage device 100 to a host device, according to some embodiments. At least some of the steps of the process 400 may be implemented by one or more components of the removable storage device 100, such as the controller 110 and/or firmware 125. As described above, the removable storage device can be connected to various types of host devices. For ease of explanation, the following describes the controller 110 as performing the process, though other components of the removable storage device 100 could perform one or more of the steps.

At block 402, a removable storage device 100 is disconnected from a first host device. The first host device may be a phone 137, laptop 133 or another type of host device.

At block 404, the removable storage device 100 is connected to a second host device. In some situations, the first host device and the second host device are the same device and storage device is simply reconnected to same host device after being disconnected. In other situations, the first host device and the second host device are different host devices. For example, the first host device may be a laptop 133 and the second host device may be a phone 137, where a user is transferring data from the laptop to the phone.

At block 406, a controller 110 of the removable storage device 100 provides a file index 140 (or index of files) from the removable storage device (e.g., from the volatile memory) to an application on the second host device. The application may be a mobile app (e.g., a photo/media viewer), file system application, media reader, or other type of application configured to read data from the removable storage device. As discussed above, the controller 110 and the application may communicate via a common application programming interface (API), a vendor specific command, or the like.

At block 408, the controller 110 causes the application on the host device to display files on the storage media 115 based on the index file. In some embodiments, neither the application nor the host device performs indexing on the storage media. Instead, the application can rely only on the index file to read and/or display the contents of the storage media. For example, the application can use the file index to display a root directory of the storage media. By relying on the file index, the application can avoid user interface slowdowns due to indexing operations, which can include multiple reads performed on the storage media. If the storage media is particularly large (e.g., tens or hundreds of gigabytes) and contains a large number of files, having the application determine the contents of the storage media could take several seconds or even longer. This can reduce user satisfaction with the performance of the application and/or the removable storage media due to the apparent slowness of the user interface. The process 400 may then end.

FIG. 5 illustrates a process 500 for handling a situation where there is insufficient memory for the file index in the removable storage device 100, according to some embodiments. At least some of the steps of the process 300 may be implemented by one or more components of the removable storage device 100, such as the controller 110 and/or firmware 125. For ease of explanation, the following describes the controller 110 as performing the process, though other components of the removable storage device 100 could perform one or more of the steps.

At block 502, a controller 110 of a removable storage device 100 receives a write operation from a first host device. Prior, in one embodiment, the removable storage device 100 is physically connected to the first host device. For example, the removable storage device 100 may be inserted into a card slot or connected via USB.

At block 504, the controller 110 performs the write operation. For example, a folder or file may be created or updated on a storage media 115 of the removable storage device 100.

At block 506, the controller 110 determines that there is insufficient buffer 120 (e.g., volatile memory) and/or reserved area in the storage media 115 (e.g., non-volatile memory). In some embodiments, the removable storage device 100 stores the file index 140 in the buffer, with the file index being flushed to the storage media as needed. The controller 110 may first check if there is space in the buffer, and if there is not enough space, the controller 110 may attempt to flush the file index stored in the buffer to the reserved area. If there is enough space in the reserved area, the file index is flushed, freeing up space in the buffer. The write process can then proceed as discussed in FIG. 3. However, if there is not enough space in the reserved area and the buffer, the process proceeds to block 508.

At block 508, the controller 110 identifies a directory associated with the write operation. For example, if a file is being added to the root directory, the identified directory is the root directory.

At block 510, the controller 110 marks the directory associated with the write operation as not updated in the file index. In one embodiment, a dirty bit associated with a node in a delta structure as described in FIG. 2 is used to track whether a particular directory is up-to-date.

At block 512, the removable storage device 100 is disconnected from the first host device and connected to a second host device. The first host device and the second host device may be different devices or can be the same device.

At block 514, the controller 110 provides the file index to the second host device. In one embodiment, the file index is provided to an application in the second host device, such as a mobile app or file system application.

At block 516, the controller 110 causes the application on the second host device to index the directory marked as not updated. In one embodiment, when the controller provides the file index to the application, the application is configured to search the file index for any dirty bits indicating an updated directory. The application can perform indexing operations (e.g. reading indicated directories and/or associated attributes) on the indicated directories to obtain current information for all the directories stored in the storage media 115.

At block 518, the controller 110 causes the application to display files on the storage media based on the file index and the indexing of the directory. For example, the application may be a media viewer configured to show videos and/or pictures in the storage media. In another example, the application is a file system application that shows the directories and files in the storage media. The process 500 may then end.

Additional Embodiments

Those skilled in the art will appreciate that in some embodiments, other types of concurrent file modification systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A removable storage device configured to be connected to a memory reader of a host device, the removable storage device comprising:
   buffer memory;
   storage media configured to store one or more data files; and
   a controller in the removable storage device, the controller configured to execute firmware of the removable storage device, the controller further configured to:
   while the removable storage device is connected to a first host device:
   receive a write operation from the first host device;
   monitor changes to the storage media caused by performing the write operation;
   update a file index stored on the buffer memory of the removable storage device with the monitored changes;
   receive a second write operation from the first host device;
   perform the second write operation on the storage media; and
   in response to determining that the buffer memory available in the removable storage device is insufficient to update the file index with changes caused by the second write operation, identify at least one directory associated with the second write operation as not updated in the file index; and
   in response to connecting the removable storage device to a memory reader of a second host device:
   provide the file index to an application on the second host device;
   cause the application on the second host device to index data files in the at least one directory identified as not updated in the file index; and
   cause the application to display data files stored on the storage media based on the file index.

2. The removable storage device of claim 1, wherein the buffer memory comprises volatile memory.

3. The removable storage device of claim 2, the controller further configured to:
   track the monitored changes in a delta structure stored in the volatile memory of the removable storage device.

4. The removable storage device of claim 3, wherein:
   the delta structure comprises a tree data structure identifying directory nodes; and
   each directory node comprises a dirty bit indicating whether the directory node is updated.

5. The removable storage device of claim 1, wherein the memory reader comprises a universal serial bus (USB) interface.

6. The removable storage device of claim 1, wherein the removable storage device is one of a Secure Digital (SD), miniSD, microSD, and nanoSD form factor.

7. The removable storage device of claim 1, wherein connecting the removable storage device to the memory reader of the second host device comprises:
   inserting the removable storage device into a memory slot of a smart phone,
   wherein the smart phone is the second host device.

8. The removable storage device of claim 1, wherein the application is configured to display data files of directories marked as updated without indexing the directories marked as updated.

9. The removable storage device of claim 1, wherein:
   the first host device and the second host device are the same device;

the removable storage device is disconnected from the first host device; and connecting the removable storage device to the memory reader of the second host device comprises reconnecting the removable storage device to the first host device.

10. The removable storage device of claim 1, wherein the removable storage device is not powered.

11. A method for providing an index from a removable storage device comprising storage media and a controller configured to execute firmware of the removable storage device, the method comprising:

connecting the removable storage device to a first host device;

receiving a write operation from the first host device;

monitoring, by the controller in the removable storage device, changes to the storage media of the removable storage device caused by performing the write operation;

updating, by the controller, a file index stored on the removable storage device with the monitored changes;

receiving a second write operation from the first host device;

performing the second write operation on the storage media;

in response to determining that there is insufficient volatile memory to update the file index with changes caused by performing the second write operation, identifying at least one directory associated with the second write operation as not updated in the file index;

disconnecting the removable storage device from the first host device;

connecting the removable storage device to a second host device;

providing the file index stored on the removable storage device to an application on the second host device;

causing the application on the second host device to index data files in the at least one directory identified as not updated in the file index; and causing the application to display data files stored on the storage media based on the file index.

12. The method of claim 11, wherein monitoring, by the controller, changes to the storage media comprises:

tracking the monitored changes in a delta structure stored in the volatile memory of the removable storage device.

13. The method of claim 12, further comprising:

indicating, with a dirty bit in a directory node of the delta structure, whether a directory related to the write operation is updated.

14. The method of claim 11, wherein the removable storage device is one of a Secure Digital (SD), miniSD, microSD, and nanoSD form factor.

15. The method of claim 11, wherein connecting the removable storage device to the second host device comprises:

inserting the removable storage device into a memory slot of a smart phone, wherein the smart phone is the second host device.

16. The method of claim 11, wherein the application is configured to display data files of directories marked as updated without indexing the directories marked as updated.

17. The method of claim 11, further comprising:

flushing the file index from the volatile memory of the removable storage device to the storage media.

18. A removable storage device configured to be connected to a memory reader of a host device, the removable storage device comprising:

storage means for storing one or more data files; and means for executing firmware of the removable storage device, the means for executing firmware located in the removable storage device, the means for executing firmware further configured to:

while the removable storage device is connected to a first host device:

receive a write operation from the first host device;

monitor changes to the storage means caused by performing the write operation;

update a file index stored on the removable storage device with the monitored changes;

receive a second write operation from the first host device;

perform the second write operation on the storage means; and in response to determining that there is insufficient volatile memory in the removable storage device to update the file index with changes caused by the second write operation, identify at least one directory associated with the second write operation as not updated in the file index; and in response to connecting the removable storage device to a memory reader of a second host device:

provide the file index to an application on the second host device;

cause the application on the second host device to index data files in the at least one directory identified as not updated in the file index; and cause the application to display data files stored on the storage means based on the file index.

19. The removable storage device of claim 18, the means for executing firmware further configured to:

track the monitored changes in a delta structure stored in the volatile memory of the removable storage device.

20. The removable storage device of claim 19, wherein:

the delta structure comprises a tree data structure identifying directory nodes; and each directory node comprises a dirty bit indicating whether the directory node is updated.

* * * * *